(12) United States Patent
Hamelin et al.

(10) Patent No.: US 12,509,825 B2
(45) Date of Patent: Dec. 30, 2025

(54) SCREEN CYLINDER WITH BARS CONFIGURED TO RECEIVE A WEAR RESISTANT SPRAY COATING

(71) Applicant: AIKAWA FIBER TECHNOLOGIES OY, Varkaus (FI)

(72) Inventors: Mathieu Hamelin, Candiac (CA); Robert William Gooding, Montreal (CA); Benoit Martineau, Magog (CA)

(73) Assignee: AIKAWA FIBER TECHNOLOGIES OY, Helsinki (FI)

( * ) Notice: Subject to any disclaimer, the term of this patent is extended or adjusted under 35 U.S.C. 154(b) by 0 days.

(21) Appl. No.: 18/839,653

(22) PCT Filed: Jan. 19, 2024

(86) PCT No.: PCT/IB2024/050545
§ 371 (c)(1),
(2) Date: Aug. 19, 2024

(87) PCT Pub. No.: WO2024/157138
PCT Pub. Date: Aug. 2, 2024

(65) Prior Publication Data
US 2025/0163644 A1 May 22, 2025

(30) Foreign Application Priority Data
Jan. 23, 2023 (WO) .................. PCT/IB2023/050555

(51) Int. Cl.
*D21D 5/16* (2006.01)
*B07B 1/22* (2006.01)
(Continued)

(52) U.S. Cl.
CPC ................. *D21D 5/16* (2013.01); *B07B 1/22* (2013.01); *B07B 1/4609* (2013.01); *C23C 4/10* (2013.01); *C23C 4/129* (2016.01)

(58) Field of Classification Search
CPC ........... B07B 1/22; B07B 1/4609; B07B 1/12; B07B 1/18; B07B 1/4618; D21D 5/16; C23C 4/10; C23C 4/129
See application file for complete search history.

(56) References Cited

U.S. PATENT DOCUMENTS

| | | |
|---|---|---|
| 4,002,540 A | 1/1977 | Bixby |
| 4,061,283 A | 12/1977 | Kahmann |

(Continued)

FOREIGN PATENT DOCUMENTS

| | | |
|---|---|---|
| CN | 203451619 U | 2/2014 |
| CN | 110924213 A | 3/2020 |

(Continued)

OTHER PUBLICATIONS

International Search Report and Written Opinion issued in PCT/IB2024/050545 and mailed Mar. 20, 2024.

(Continued)

*Primary Examiner* — Michael McCullough
*Assistant Examiner* — Kalyanavenkateshware Kumar
(74) *Attorney, Agent, or Firm* — Nicholas Mesiti, Esq.; Heslin Rothenberg Farley & Mesiti P.C.

(57) ABSTRACT

A screen cylinder includes a cylindrical screening media having an inflow side and an outflow side. The screening media is formed of a plurality of circumferentially spaced an axially extending wedgewire bars, which have an inflow surface facing the inflow side. The axially extending wedgewire bars have a profile shape optimized to apply a spray on wear resistant coating on their inflow surface.

21 Claims, 10 Drawing Sheets

(51) Int. Cl.
    *B07B 1/46*     (2006.01)
    *C23C 4/10*     (2016.01)
    *C23C 4/129*     (2016.01)

(56) References Cited

U.S. PATENT DOCUMENTS

| | | | |
|---|---|---|---|
| 5,836,525 | A | 11/1998 | Garnier et al. |
| 6,491,168 | B1 | 12/2002 | Lutz et al. |
| 6,915,910 | B2 | 7/2005 | Lutz et al. |
| 2004/0099583 | A1* | 5/2004 | Frejborg ............... B01D 29/33 209/687 |
| 2004/0112827 | A1 | 6/2004 | May et al. |
| 2004/0195158 | A1* | 10/2004 | Gisin ................. C23C 28/023 210/500.1 |
| 2005/0040099 | A1 | 2/2005 | Lutz et al. |
| 2006/0210721 | A1 | 9/2006 | Hall |
| 2012/0119007 | A1 | 5/2012 | Kallio |
| 2014/0000467 | A1 | 1/2014 | Lunnerfjord |
| 2015/0147759 | A1 | 5/2015 | Kuersten et al. |
| 2017/0128958 | A1 | 5/2017 | Hunt |
| 2017/0362691 | A1 | 12/2017 | Li et al. |
| 2022/0186438 | A1 | 6/2022 | Parenteau et al. |

FOREIGN PATENT DOCUMENTS

| | | |
|---|---|---|
| CN | 11402684 A | 2/2022 |
| DE | 19625726 C1 | 6/1997 |
| DE | 19815449 A1 | 10/1999 |
| DE | 20021552 U1 | 3/2001 |
| DE | 20200400503 U1 | 10/2004 |
| DE | 102011081951 A1 | 3/2013 |
| DE | 202013101853 U1 | 5/2013 |
| DE | 102015121369 B3 | 1/2017 |
| EP | 0562930 A1 | 9/1993 |
| EP | 1507023 A1 | 2/2005 |
| EP | 2751335 B1 | 12/2016 |
| FI | 124364 B | 7/2014 |
| JP | 03249296 A | 11/1991 |
| WO | 01991002841 | 3/1991 |
| WO | 0029635 A2 | 5/2000 |
| WO | 03008667 A1 | 1/2003 |
| WO | 03027385 A1 | 4/2003 |
| WO | 2004079034 A1 | 9/2004 |
| WO | 2009056682 A1 | 5/2009 |
| WO | 2010139856 A1 | 12/2010 |
| WO | 2013004506 A1 | 1/2013 |
| WO | 2013029930 A1 | 3/2013 |
| WO | 2013149795 A1 | 10/2013 |
| WO | 2016059292 A1 | 4/2016 |
| WO | 2020219637 A1 | 10/2020 |

OTHER PUBLICATIONS

International Search Report and Written Opinion issued in PCT/IB2023/050555 and mailed Aug. 14, 2023.

* cited by examiner

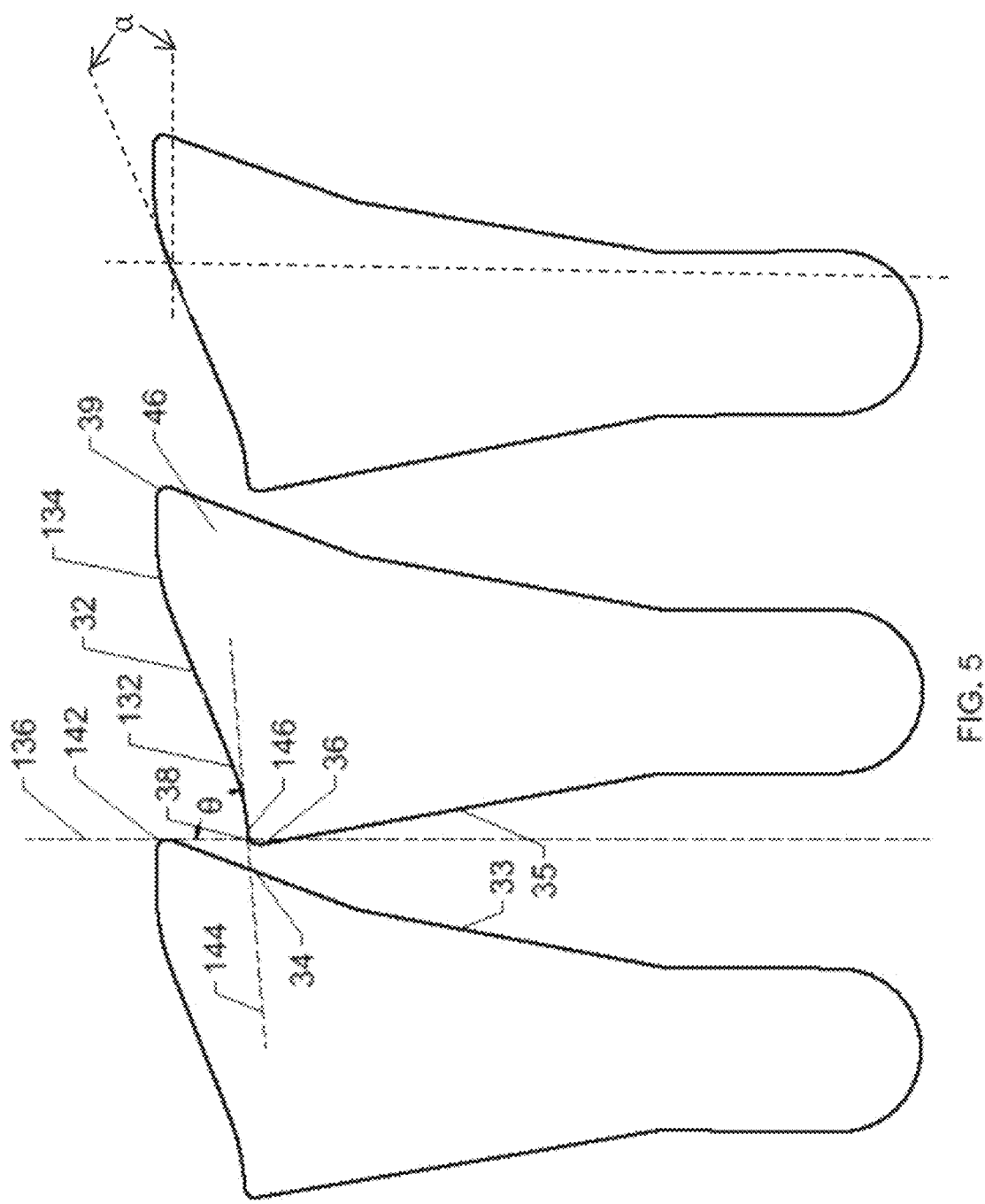

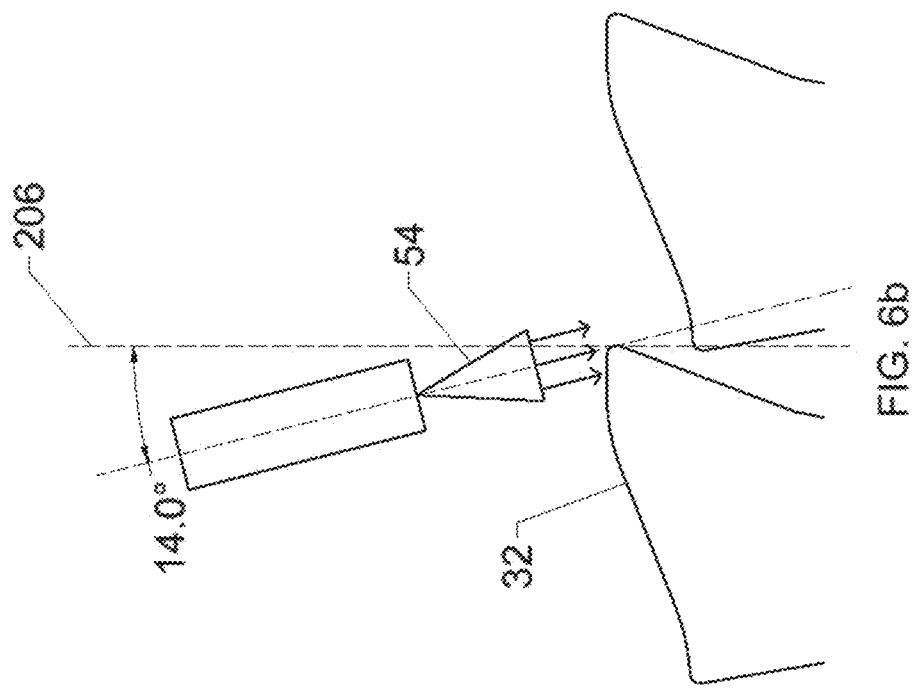
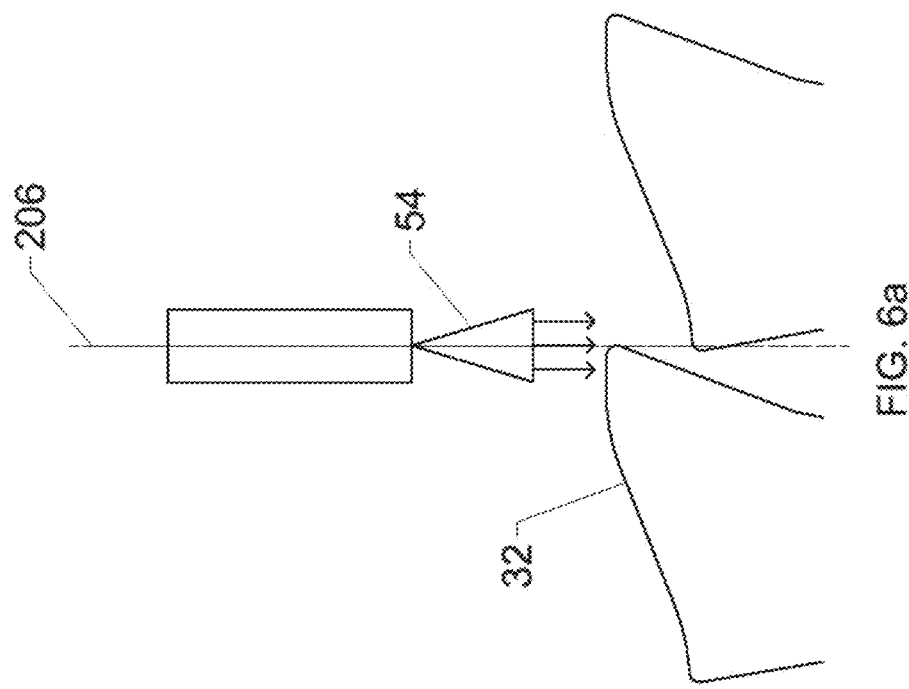

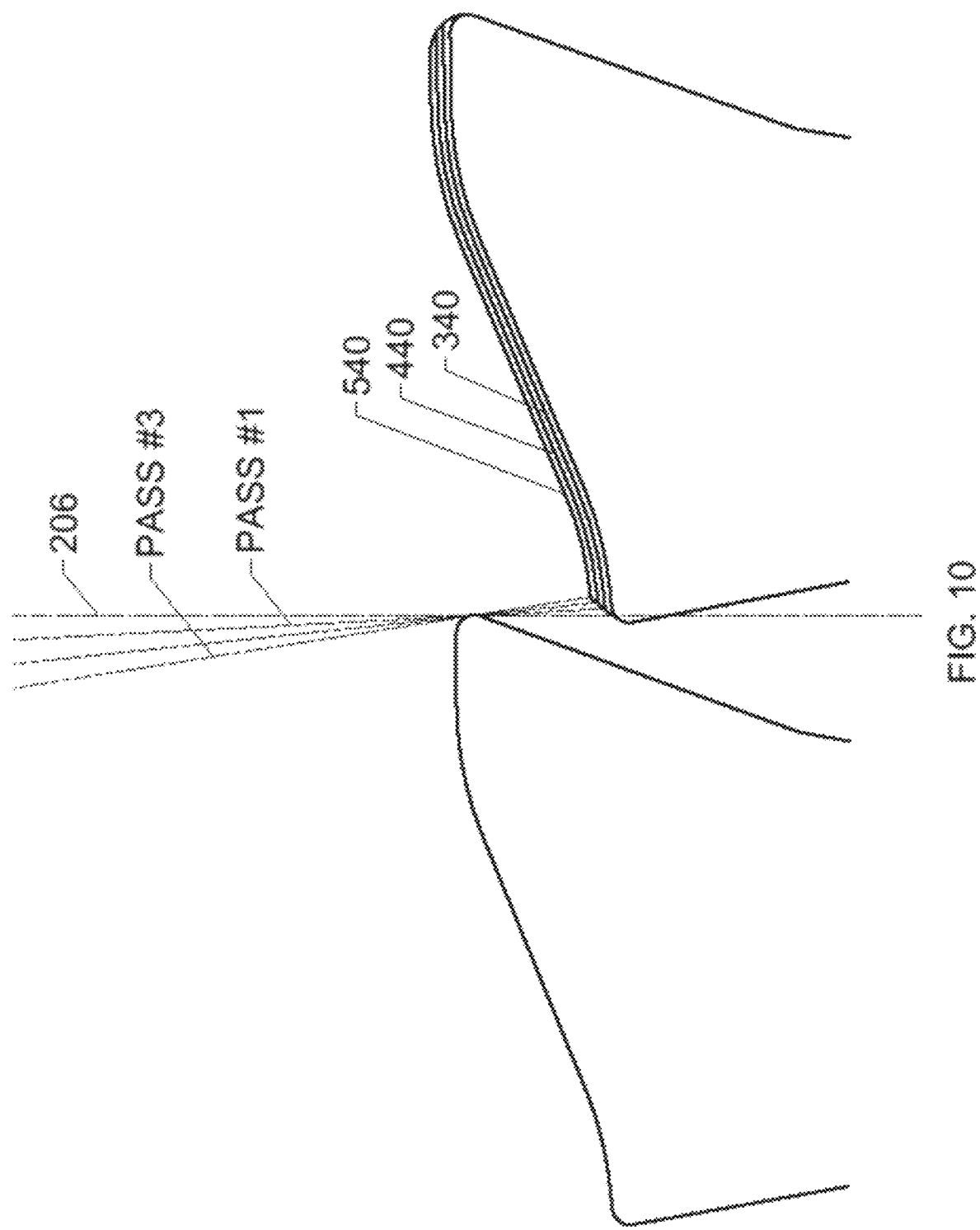

SCREEN CYLINDER WITH BARS CONFIGURED TO RECEIVE A WEAR RESISTANT SPRAY COATING

CROSS REFERENCE TO RELATED APPLICATIONS

This application is the U.S. National Phase filing under 35 U.S.C. § 371 of International Application No. PCT/IB2024/050545, filed on Jan. 19, 2024, which claims priority to International Application No. PCT/IB2023/050555, filed on Jan. 23, 2023. This application also claims priority to International Application No. PCT/IB2023/050555. The contents of these prior applications are hereby incorporated by reference herein in their entirety.

FIELD OF THE INVENTION

The present application generally relates to screen cylinders for removing oversized solid contaminants from solid-in-liquid suspensions such as pulp and, in particular, screen cylinders made from wedgewire bars having a configuration optimized for receiving a spray-on wear resistant coating, and methods of applying the wear resistant coating.

BACKGROUND

Papermaking involves the processing or production of pulp, which is a solid-in-liquid suspension of fibers, such as cellulose fibers or other fibers. Pulp often includes various contaminants such as wood fragments, fiber bundles, metal pieces, hardened adhesives, or other contaminants. This is particularly the case where paper is made from recycled paper as a source of the pulp as such recycled paper pulp may be prone to the presence of hardened adhesives, metal fragments, and plastic particles therein. These contaminants, if not removed, will likely decrease the quality of the paper and/or interfere in the paper-making processes.

To remove the contaminants including oversized particles or fibers, the pulp is often screened. Screening may also be used to fractionate the pulp into streams with different fiber size distributions. Pulp screening can be accomplished by introducing the pulp to a pulp screen in which the acceptable portions of the pulp pass through openings such as slots within the screen. The oversized solid contaminants or other unacceptable portions of the pulp will not pass through the slots or openings within the screen and will exit from an outflow end of the screen as rejects via an outlet. Pulp screens may also be used for removing oversized and other solid contaminants from slurries and solid suspensions other than pulp.

Pulp screening can be accomplished using a screen cylinder located within a pulp screen. A screen cylinder can screen many types of fibers such as, but not limited to, cellulose fibers, cotton fibers, fiberglass fibers, or other fibers. The screen cylinder can be an inward-flow screen cylinder, in which the acceptable portions of solid suspension flow radially inward through the screen cylinder, or an outward-flow screen cylinder, in which the acceptable portions of the solid suspension flow radially outward through the screen cylinder. The pulp screen may include a rotor or other device operable to accelerate the pulp suspension to create the desirable flow conditions at the entries to the apertures in the screen cylinder, as well as to create pressure pulsations that backflush blockages from the screen cylinder apertures. Each of these actions promotes the passage of acceptable pulp through the screen slots while restricting the passage of contaminants and undesirable pulp. Some screen cylinders utilize a solid metal cylinder through which a plurality of holes or slots are drilled or milled. However, to improve the throughput of the pulp screening process, screen cylinders that include a plurality of longitudinally-arranged, profiled wedgewire bars, which form a plurality of slots therebetween extending for most of the length of the screen cylinder, are generally preferred for pulp screening.

These wedgewire screen cylinders are typically made from arranging a plurality of wedgewire bars in a cylindrical shape. Slots formed between the wedgewire bars allow desirable pulp to pass therethrough while preventing undesirable pulp or other contaminants from also passing through. Thus the slot size of a screen cylinder is chosen based upon pulp parameters and such desired results. However, pulp is abrasive and causes the screen cylinder and the bars forming the same to wear out after some use. Wear of the screen cylinder may affect the performance and/or efficiency of the screen cylinder.

Wear resistant coatings such as chrome have been applied to the bars that form the slots in the screen cylinder to help minimize wear of the bars and thus the cylinder. Chrome coatings are applied using an electroplating process where the cylinder is in a bath of chromic acid and other chemical components. The cylinder acts as a cathode during the electroplating process and chrome is thus deposited on the wedgewire bars. However, chrome coatings may be difficult to apply consistently on the surface of the bars due to the variability of various factors in the electroplating process including: the electrical current flow, the temperature of the acid bath, the gap between the anode and cathode (i.e. the cylinder), and the chemical strength of the acid bath. Also, wear resistant coatings may be applied to the bars by known coating or spraying methods, such as but not limited to, high-velocity oxygen fuel (HVOF) spraying, plasma spraying, laser spraying, chemical vapor deposition (CVD), physical vapor deposition (PVD), and atomic layer deposition (ALD).

High-velocity thermal coatings are typically sprayed onto the bars using high pressure and a high-velocity nozzle. The spray may be difficult to control and may result in the coating being sprayed onto undesirable locations on the screen cylinder and bars. For example, the high velocity spray may deflect off of surfaces of the bars onto adjacent surfaces resulting in the so-called "overspray". Overspray of the wear resistant coating, including the coating deflecting onto adjacent surfaces, may introduce restrictions that affect the flow through the slots. Alternatively, the spray may not reach areas where protection against wear is desired, or be applied to the required degree. For example, the wear resistant coating applied to the bars on the inflow surface near the ridge of a bar, where excessive wear may occur, may not receive adequate coating. In another example, the area on the inflow surface near the transition area may not receive adequate coating because the coating spray is effectively blocked by the ridge of the adjacent bar.

It is therefore desirable to achieve a screen cylinder and process for making and using the same, where a wear resistant coating is applied in a manner where the resultant coating is located on desirable locations of the bars and not on other locations, the effects of overspray are minimized, and/or to provide a coating pattern or shape on the screen cylinder bars that reduces screen cylinder wear, optimizes the life of the screen cylinder and creates the hydrodynamic conditions essential for good screen capacity.

Also, the shape of the wedgewire bars, including their inflow surface and sides, including side portions which form a slot within, through which pulp or other solid-in-liquid suspensions pass, may be optimized to reduce overspray and eliminate or minimize the deposition of the sprayed wear resistant coating on undesirable locations of the bars including at or near the slots or even the side surfaces of the bars. Also, such shape, together with other features and techniques disclosed herein, facilitates maximizing overall deposition efficiency of the coating, maximizes the coating thickness on the inflow surface near the ridges of the bars, and minimizes the area on the inflow surface of the bars opposite the ridges which may otherwise not receive adequate coating. In addition, the technique for spraying the wear resistant coating onto the bars may be optimized to: reduce overspray and eliminate or minimize depositing the sprayed wear resistant coating on undesirable locations of the bars including at or near the slots or even the side surfaces of the bars, maximize the coating thickness on the inflow surface near the ridges of the bars, and minimize the area on the inflow surface of the bars opposite the ridges which may otherwise not receive adequate coating.

SUMMARY OF THE INVENTION

Accordingly, an ongoing need exists for a screen cylinder having wear resistant coating where the coating is applied in a more controlled manner and on specific desired locations of the bars and/or sections of the screen cylinder, while minimizing overspray and maximizing the deposition and retention of the spray material on the desired surfaces.

According to one or more aspects, a screen cylinder includes a cylindrical screening media having an inflow side and an outflow side. The screening media is formed of a plurality of circumferentially-spaced, axially-extending wedgewire bars, which have an inflow surface facing away from the at least one support ring, a first side surface extending from the inflow surface to the attachment end of the bar opposite the inflow surface and a second side surface opposite the first side surface and extending from the inflow surface to the attachment end of the bar. Each of the axially-extending wedgewire bars has an inflow surface shape optimized to apply a spray of a wear resistant coating on its inflow surface. The bars are each formed of a base material and each has an inflow-facing surface, a first side surface having a first slot surface, and a second side surface having a second slot surface opposite the first side surface. The first slot surface of one bar and the second slot surface of another adjacent bar may define a slot. A transition area connects the second slot surface to the inflow facing surface. A ridge is located between the inflow-facing surface and the first slot surface. The ridge is located: i) at a radial distance further from the support ring than the radial distance from the support ring to the transition area, and ii) where the ridge extends at a circumferential location at or past a location of the first slot surface defining the slot width. The wedgewire bars are shaped and configured such that an angle formed by: i) a first plane extending axially and radially from the center of the cylindrical screening media to a circumferential location where the ridge of a first bar is closest to an adjacent facing bar and ii) a second plane extending axially and coplanar from the inflow-facing surface at a location where the inflow-facing surface meets the transition area of an adjacent bar facing the first bar is greater than or equal to 80 degrees. And, this angle is preferably 90 degrees or less, so that the preferred angle is between 80 and 90 degrees.

A portion of the axially extending bars comprise a spray-on, wear resistant coating over the base material and on the inflow-facing surface of the screening media. The wear resistant coating preferably does not form a layer which extends past the first plane and/or a plane extending coplanar from the first slot surface at a location defining the narrowest dimension of a slot between the first slot surface of a first bar and the second slot surface of an adjacent bar which faces the first slot surface of the first bar.

The base material forming the inflow-facing surface of the axially-extending bars may comprise a first area of the inflow-facing surface proximate the transition area, the first area extending towards the ridge and comprising a concave surface area; and a second area of the inflow facing surface adjacent the first area comprising a convex surface area.

The first area extends towards the ridge and forms the concave surface area, which includes an area of increased slope, which is to say that a point on a plane tangential to the inflow surface area will move further away radially from the support ring at increasing rates as the point moves in the circumferential direction from the transition area towards the ridge. The second area of the inflow facing surface adjacent the first area forms the convex surface area and includes an area of decreased slope. The second area has a surface thereon proximate the ridge which has a slope less than a slope of the second area proximate the first area. Each slope is measured at a point on a plane tangential to the inflow surface area. The slopes may progressively increase at the first area and/or progressively decrease at the second area. The first area and second area each preferably do not exhibit a negative slope. The profile of the inflow surface may resemble a smooth continuous wave shape. The slope of the inflow surface is preferably less than thirty degrees at all locations on the inflow surface.

In some aspects, the first area proximate the transition area may form a generally flat surface. This generally flat area proximate the transition area may be less than about 50 percent of the maximum width of the bar, and preferably less than about 20 percent of the maximum width of the bar. Also, this flat surface may face normal to the radius of the screen cylinder. The second area proximate the ridge may also form a generally flat area. This generally flat area proximate the ridge may be less than about 50 percent of the maximum width of the bar, and preferably less than about 20 percent of the maximum width of the bar. Also, this flat surface may face normal to the radius of the screen cylinder. The area between the first area proximate the transition area and the second area proximate the ridge may also be a flat surface, but inclined. For example, the first area and second area may form a relatively flat area on the inflow-facing surface of relatively constant slope.

The wear resistant coating is preferably applied using a high velocity thermal spray process, such as a high velocity oxygen-fuel (HVOF) process, where the coating is preferably between 75-300 microns in thickness. And, the thickness of the wear resistant coating on and normal to the base material preferably varies by less than twenty percent and ideally less than ten percent. The wear resistant coating may comprise tungsten carbide and/or chromium carbide. Basic elements, such as, for example, Ti, V, Nb, Mo, Ta and Hf, can also occur as carbides and can be used in carbide-containing wear resistant coatings. Cobalt, chromium and nickel carbides can be used in the wear resistant coatings as well. And, the wear resistant coating may exhibit a hardness between 500HV0.05 to 1200HV0.05. The hardness values may be determined through measurements performed in accordance with standard Vickers hardness test methods.

The axially-extending bars comprise an attachment end at the outflow side. The attachment end is secured to notches in rings to form the screen cylinder.

In yet another aspect, a screen cylinder includes a cylindrical screening media having a plurality of circumferentially-spaced, axially-extending slots formed between axially-extending bars. The screening media has an inflow side and an opposite outflow side. The bars each have an inflow-facing surface, a first side surface having a first slot surface, and a second side surface having a second slot surface opposite the first slot surface. The inflow-facing surface is between the first side and first slot surface, and the second side and second slot surface. A ridge is between the inflow-facing surface and the first side and first slot surface. The inflow-facing surface of the axially extending bars extends from a transition area proximate the second slot surface. The inflow-facing surface includes a first area of the inflow-facing surface proximate the transition area and a second area of the inflow-facing surface adjacent the first area comprising a convex surface area. The first area extends towards the ridge and comprises a concave surface area. The first area has an area of increasing slope. The transition area connects the second side surface and second slot surface to the inflow-facing surface. The second area of the inflow surface has an area towards the ridge which decreases in slope. The ridge is located at: i) a radial distance further from the support ring than the radial distance from the support ring to the transition area and ii) where the ridge extends at a circumferential location at or past a location of the first slot surface defining the slot width. The second area may have a surface thereon proximate the ridge which has a slope less than a slope of the second area proximate the first area. The slopes of the first and second areas may increase and decrease, respectively. The slopes may progressively increase and decrease respectively. The first area proximate the transition area may form a generally flat surface. The second area proximate the ridge may also form a flat area. The area between the first area proximate the transition area and the second area proximate the ridge may also be a flat surface, but inclined. For example, the first area and second area form a relatively flat area on the inflow facing surface of relatively constant slope. A spray-on, wear-resistant coating is subsequently applied to the inflow-facing side of the screening medium and the inflow surface of the bars. The wear resistant coating preferably does not form a layer on the bar which extends circumferentially past the ridge and the transition area of an adjacent bar facing the ridge.

The wear resistant coating is preferably sprayed on the inflow surface of the axially-extending bars of the screening media using a spray nozzle. The spray nozzle is moved axially in spray passes within the screen cylinder to apply the wear resistant coating on the inflow surface of the axially-extending bars of the screening media. The angle of the spray nozzle may be varied in the circumferential direction relative to the inflow side of the screening medium to change the spray angle of the projected coating material that is sprayed on the bars. For example, the angle of the spray nozzle relative to the inflow surface of the bars may be changed during or between spray passes of the spray nozzle. Varying the spray nozzle angle allows the spray of wear resistant coating onto the inflow surface of the bars to be optimized and to reduce overspray. The angle of the spray nozzle may be varied in the circumferential direction between about 5 to 31 degrees, and preferably between 5 to 14 degrees. The angle of the spray nozzle rotates circumferentially in the direction from the transition area of a bar to the ridge of the same bar to vary the spray angle of the spray nozzle. Each incremental rotation of the angle of the spray nozzle should be between 0 and 3 degrees and preferably 1 to 2 degrees. The angles are measured in the direction clockwise or counterclockwise from the nozzle to the central axis of the screen cylinder. The number of passes, or the speed of the passes of the spray nozzle, when spraying the coating, may be varied. And, such variations may occur for different spray passes or during a spray pass. Such variations may be used to change the local thickness of the wear resistant coating during or between spray passes, if desirable.

The wear resistant coating may be applied while the screen cylinder rotates while moving the spray nozzle during axial passes and while spraying the wear resistant coating. The speed of rotation of the screen cylinder may remain constant, which may facilitate depositing consistent layers of coating. Alternatively, the speed of rotation of the cylinder may vary based upon the position of the spray nozzle. The number of spray passes, where each is pass is defined as when the spray traverses the length of the screen cylinder, may be up to about 7 to 30 passes. For each pass, the spray nozzle may deposit a coating in thickness of about 10 microns.

The foregoing general description and the following detailed description describe various embodiments and provide an overview or framework for understanding the nature and character of the claimed subject matter. The invention, however, is in no way limited to the specific disclosed embodiments.

BRIEF DESCRIPTION OF THE DRAWINGS

The accompanying drawings are included and constitute part of this specification. The drawings illustrate the various embodiments described herein, and together with the description serve to explain the principles and operations of aspects of the invention.

FIG. 5 depicts a side cross-sectional view of three bars within the screen cylinder of FIG. 1 without the wear resistant coating thereon formed on a base material, according to one or more embodiments of the invention shown and described herein;

FIGS. 6a and 6b depict schematic representations of a spray nozzle relative to one or more wedgewire bars to apply the wear resistant coating on the inflow surfaces of the bars, and the angles of the spray nozzle, which can be varied during passes thereof to apply the wear resistant coating onto the inflow surfaces of the bars;

FIG. 10 depicts a cross-sectional close-up view of a part of a bar in FIG. 9 with three constituent layers forming a portion of the coating thereon, and applied at the spray angles referred in FIG. 9.

DETAILED DESCRIPTION

Figure 1:
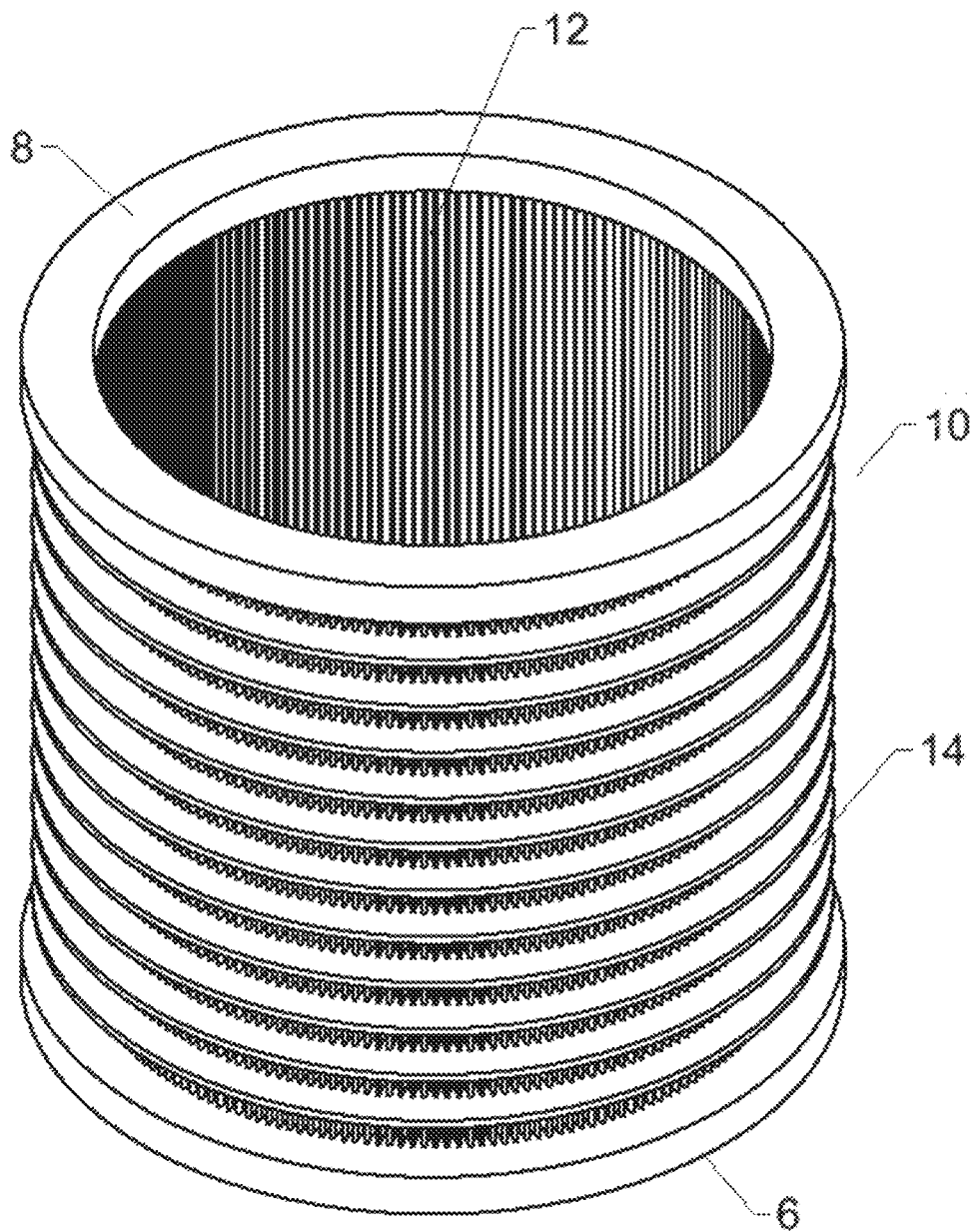
FIG. 1 schematically depicts a front perspective view of a screen cylinder, according to one or more embodiments shown and described herein.

Reference will now be made in detail to embodiments of screen cylinders having profiled wedgewire bars, examples of which are illustrated in the accompanying drawings. The same reference numerals will be used throughout the drawings to refer to the same or like parts.

Directional terms as used herein, for example up, down, right, left, front, back, top, bottom, are made only with reference to the figures as drawn and the coordinate axis provided therewith and are not intended to imply absolute orientation. Also, references to a thickness including the thickness of a wear resistant coating include and refer to a nominal thickness, which is a thickness, when referring to the wear resistant coating, which may not be uniform, but rather has some variation from the desired or nominal thickness. For example, a nominal thickness of 100 microns coating may vary 10 to 15 percent and not be completely uniform in thickness.

As used herein, the singular forms "a," "an" and "the" include plural referents unless the context clearly dictates otherwise. Thus, for example, reference to "a" component includes aspects having two or more such components unless the context clearly indicates otherwise.

As used herein, the term "longitudinal" or "axial" may refer to an orientation or direction generally parallel with the center axis of the screen cylinder.

As used herein, the term "radial" may refer to a direction along any radius, which extends outward from the center axis of the screen cylinder (FIG. 1).

As used herein, the term "circumferential" refers to a direction clockwise or counterclockwise, as the case may be, about the central axis of a screen cylinder.

As used herein, the terms "inflow" and "outflow" may refer to relative positions of features with respect to a direction of flow of the solid suspension or slurry, as inflow when entering the slots and outflow when exiting the slots. For the wedgewire bars of the present disclosure, the flow of solid-in-liquid suspension is generally from the inflow surfaces 32 of the profiled bars 12 towards the outflow attachment ends 30 of the profiled bars 12. So, for example, the "inflow direction" or "towards the inflow direction" refers to the direction upstream the direction of flow. However, the "outflow direction" or "towards the outflow direction" refers to the direction downstream the direction of flow, which is opposite the inflow direction. "Upstream" and "downstream" refer to flow locations relative to one another where the general, time-averaged flow of the solid suspension moves from upstream to downstream. For the screen cylinder the inflow end refers to the end of the screen cylinder where the pulp enters, while the outflow end refers to the end where the reject pulp exits.

Also, the term "solid contaminant" or "oversized solid contaminant" may refer to solid objects, such as fiber bundles, metal fragments, hardened adhesives, or other contaminants that are not intended to be and are not desired in the solid suspension or slurry and may be distinguished from the solid constituents that are intended to be in the solid-in-liquid suspension, such as pulp fibers for example.

Figure 2:
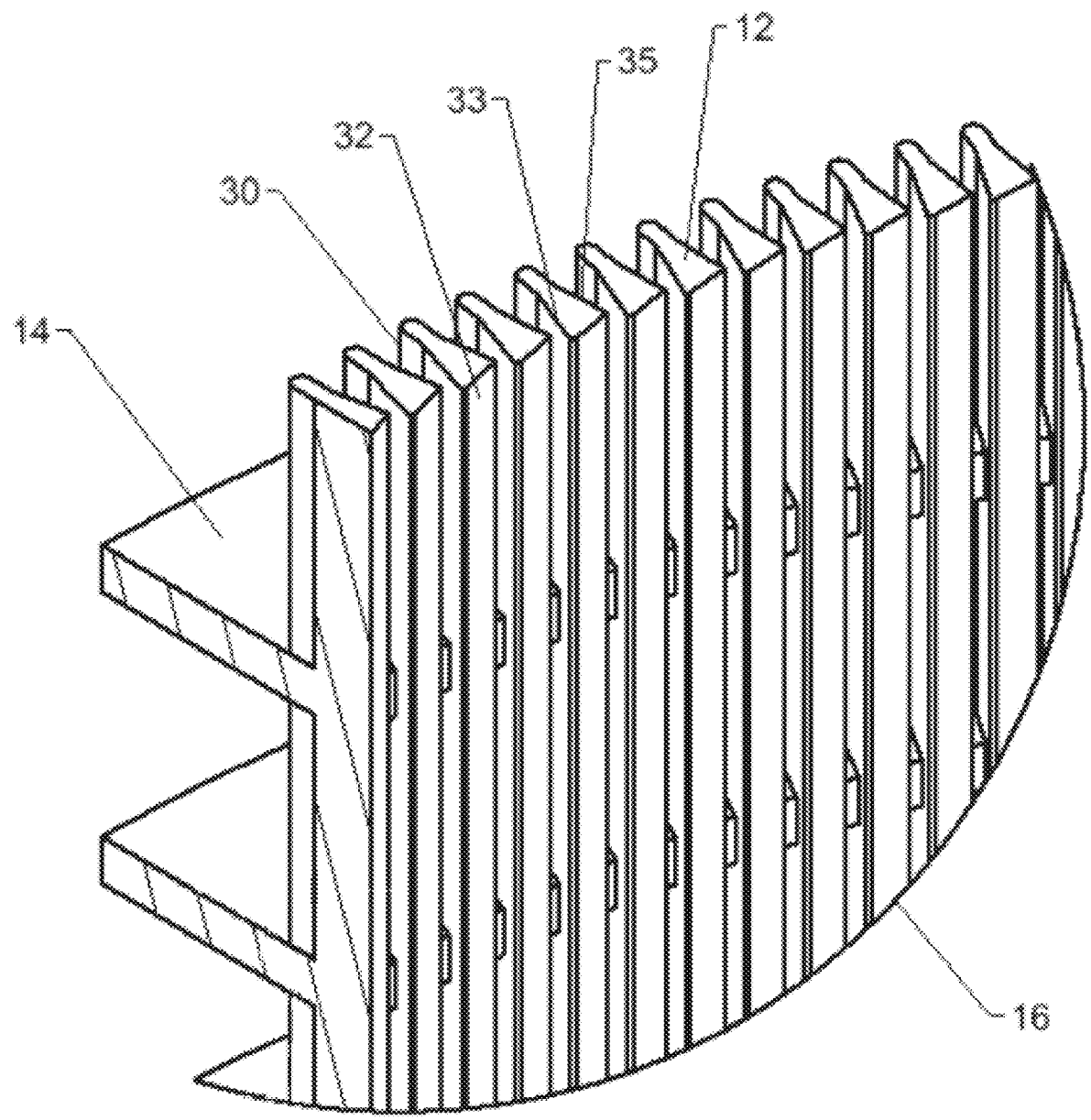
FIG. 2 schematically depicts a perspective view of a portion of the screen cylinder of FIG. 1 showing a plurality of profiled bars coupled to support rings of the screen cylinder, according to one or more embodiments shown and described herein.

Referring to FIG. 1, an inflow type screen cylinder 10 according to embodiments of the present disclosure is illustrated. The screen cylinder includes an inflow end 8 at an axial end thereof and an outflow end 6 at the opposite axial end thereof. Pulp or a similar fibrous suspension enters the cylinder at the inflow end 8 and rejects (including an elevated concentration of the undesirable constituents) exit the cylinder at the outflow end 6. Accepts, including a preponderance of the desirable pulp, with a reduced concentration of the undesirable constituents, pass through the screening media radially and are collected for later use. Referring to FIGS. 1 and 2, the screen cylinder 10 includes the plurality of wedgewire bars 12 aligned longitudinally and coupled to a plurality of support rings 14 at attachment ends 30 of the bars 12. The screen cylinder 10 may also include annular end flanges at either axial end of the screen cylinder 10. Although not shown in the drawings herein, the screen cylinder will normally be accompanied by a rotor to create pressure pulsations which facilitate the flow of pulp through the slots of the screen cylinder. Details on construction of a screen cylinder and their operation may be found in U.S. Pat. Nos. 7,188,733, 7,856,718, and 5,200,072, the entire contents of each of which are incorporated by reference herein.

Figure 3:
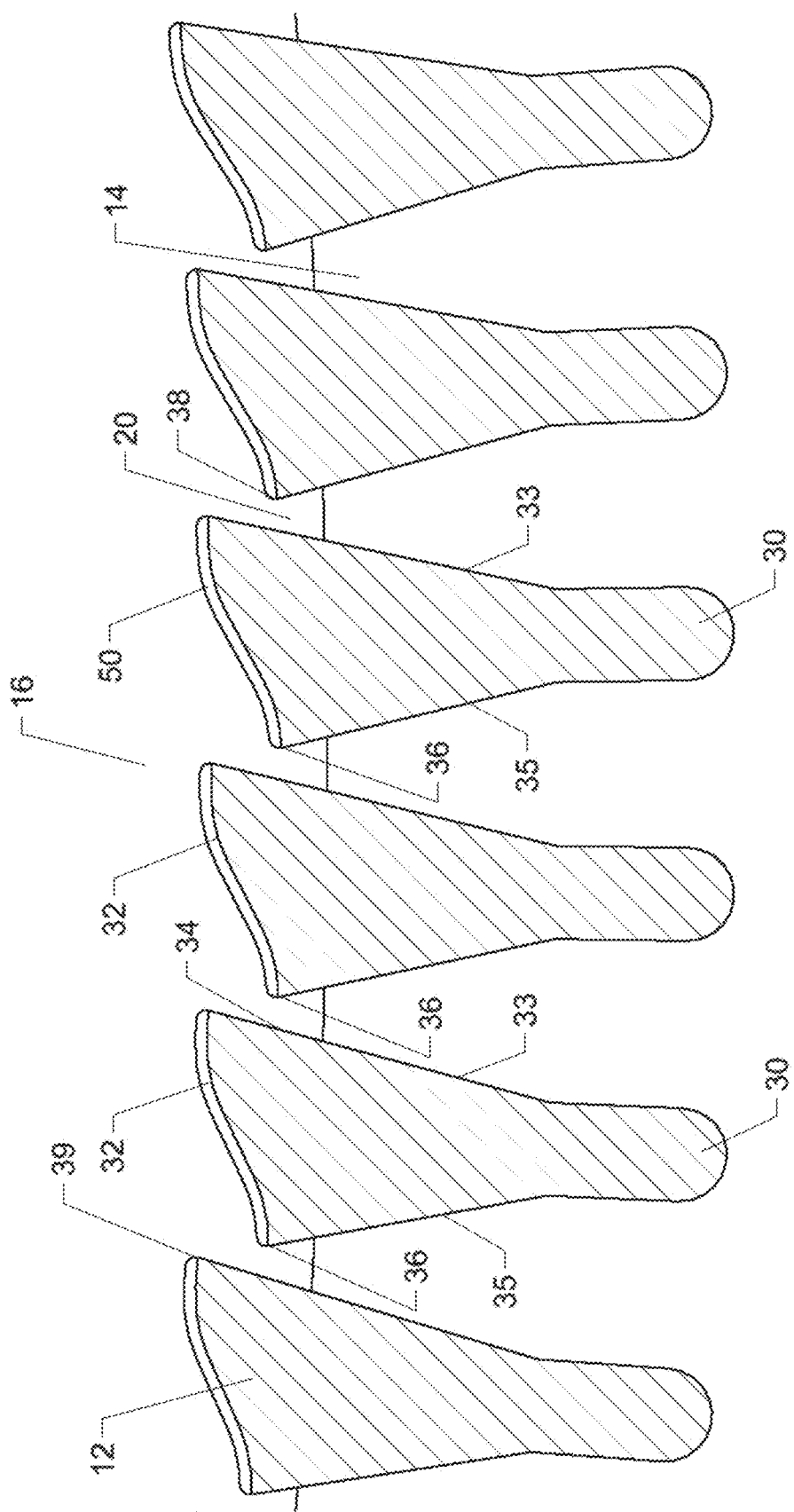
FIG. 3 schematically depicts a cross-sectional view of profiled bars of the screen cylinder of FIG. 1, the profiled bars having a wear resistant coating on an inflow surface of the profiled bars.
Figure 4:
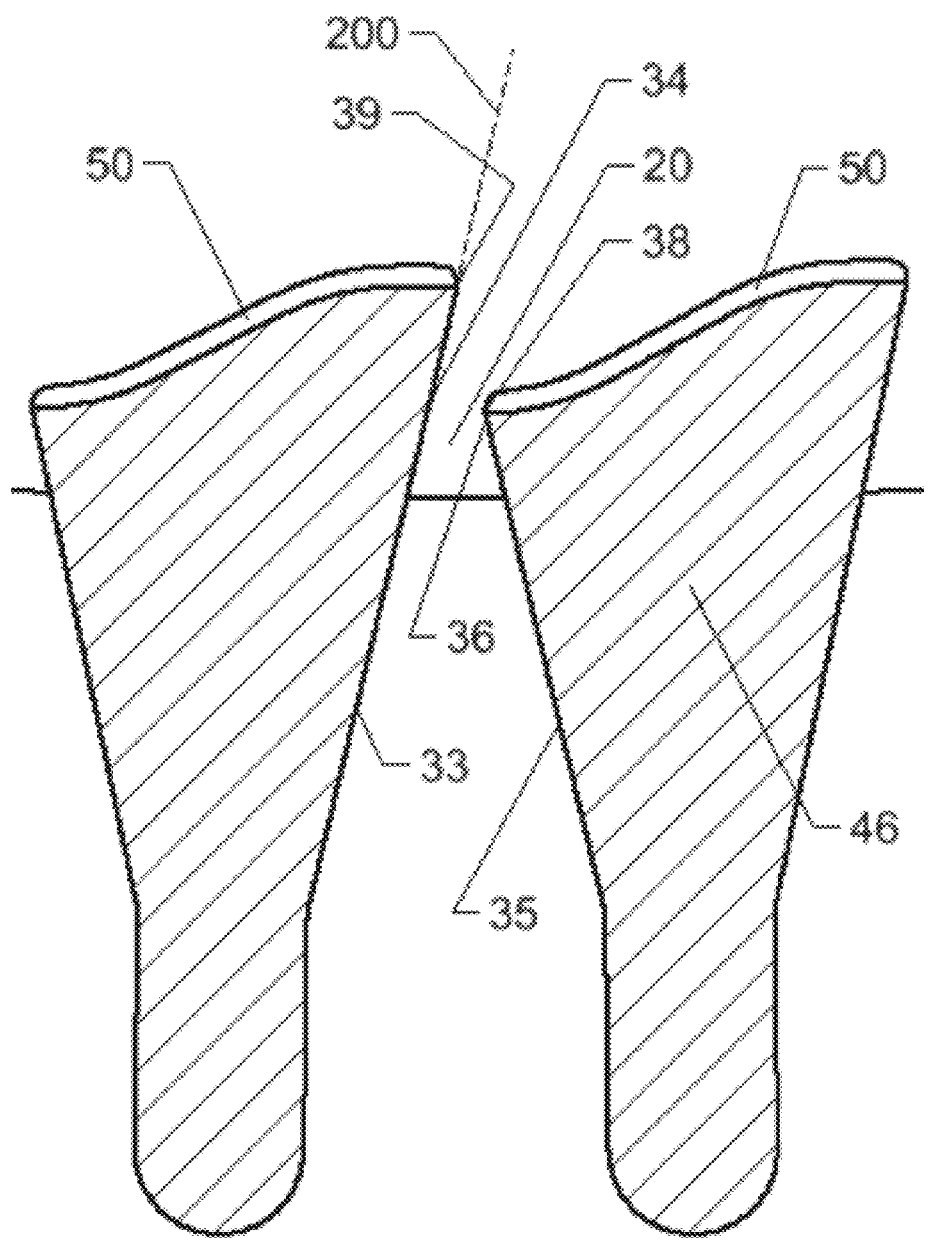
FIG. 4 schematically depicts a sectional side view of a pair of wedgewire bars mounted on a support ring and in the screen of FIG. 1, having a wear resistant coating with a slot between the first slot surface of one bar and a second slot surface of an adjacent bar, according to one or more embodiments of the invention shown and described herein.
Figure 7:
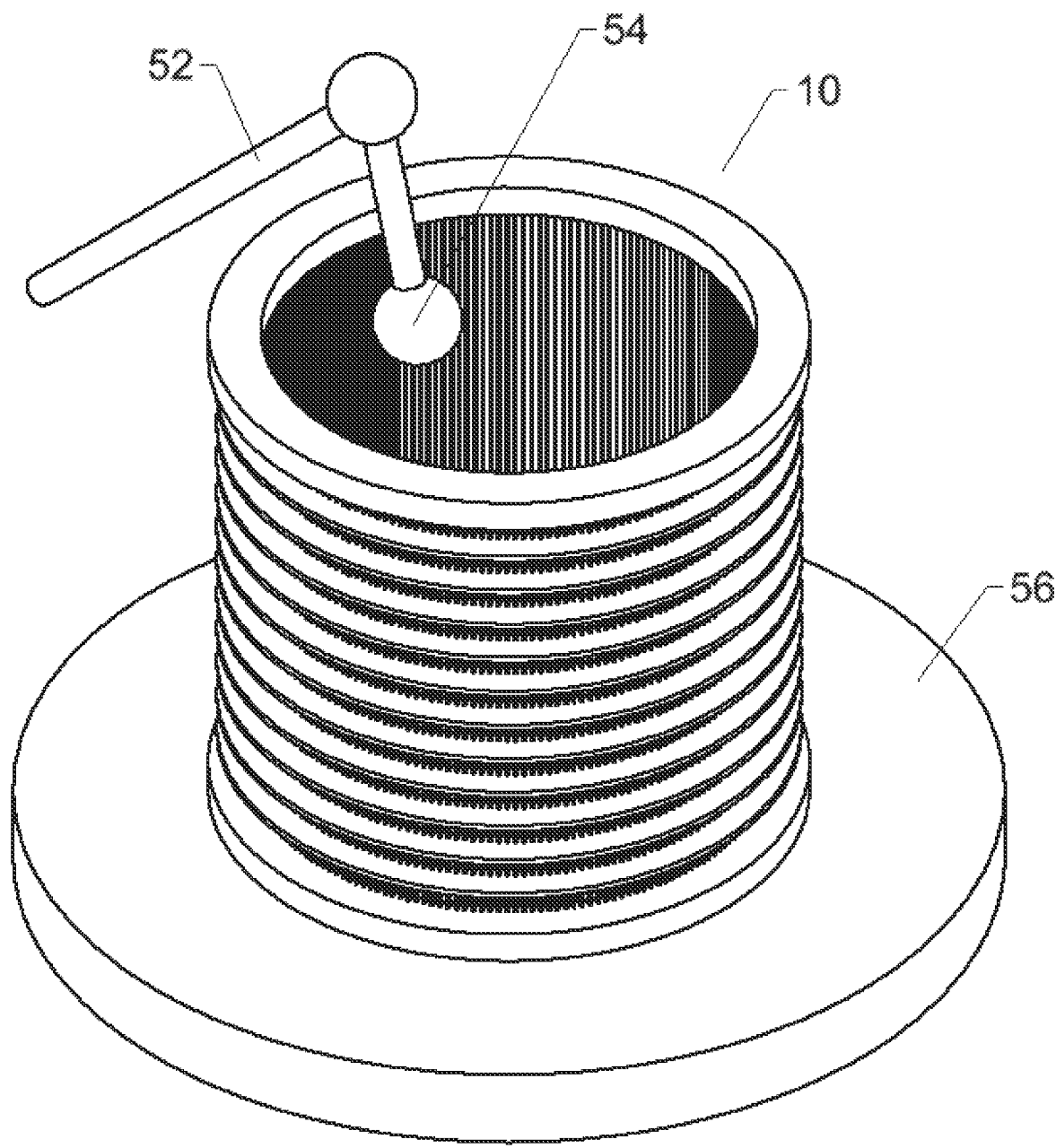
FIG. 7 depicts a view of a screen cylinder with a robotic arm having a spray nozzle at an end thereof to spray the wear resistant coating onto the inflow surfaces of the bars.

Referring to FIGS. 2 and 3 and a view of a portion of the slotted cylindrical wall 16, each profiled bar 12 may include an inflow surface 32 facing in the inflow direction away from the support ring 14, a first side surface 33 having a first slot surface 34 extending from the inflow surface 32 to the attachment end 30 of the profiled bar 12, and a second side surface 35 having a second slot surface 36 opposite the first slot surface 34 and extending from the inflow surface 32 to the attachment end 30 of the profiled bar 12. The first slot surface of one profiled bar and the second slot surface of another adjacent profiled bar define a slot 20 (FIGS. 3 and 4). Each of the profiled bars may include a wear resistant coating 50 on at least the inflow surface 32 of the profiled bar 12. The inflow surfaces 32 of the bars are located on the inflow side of the screening medium and cylinder. The attachment ends of the bars are located on the outflow side of the screening medium and cylinder. During operation of the screen cylinder 10 acceptable portions of the pulp or other solid suspension flow radially outward through the slots 20 (see FIG. 3) in the slotted cylindrical wall 16. The wear resistant coating 50 applied to the profiled bars 12 may reduce wear of the profiled bars 12 caused by the abrasive solid constituents of the pulp. Reducing wear on the bars and their inflow surfaces, and especially those portions located towards the outlet end of the screen cylinder, may help maintain the performance and efficiency of the screen cylinder 10 over time, as the inflow surfaces of the bars tend to wear at an increased rate, causing a need to replace the entire screen cylinder. Thus, reducing wear of the screen cylinder 10 over time may increase the service life of the screen cylinder.

Although the specifics of the screen cylinder described herein are an example of a typical screen cylinder, screen cylinders may vary in construction and features. For example, some screen cylinders may incorporate a structural backing plate on the outside of the screen cylinder to support the structure of the screen cylinder. Such a construction is shown and described in U.S. Pat. No. 5,200,072. The structural backing plate may allow for fewer support rings on the screen cylinder. In any event, the benefits and features of the invention described herein are achievable and useable in different types of screen cylinders including, but not limited to, screen cylinders with or without a structural backing plate.

Referring to FIG. 1-3, each of the bars 12 is longitudinally aligned and circumferentially spaced about a center axis of the screen cylinder 10 and with each of the other bars 12. The bars 12 are arranged side-by-side along a circular inner or outer circumference of the support ring 14 to form a slotted cylindrical wall 16. The slotted cylindrical wall 16 formed by the plurality of bars 12 includes slots 20 defined between each adjacent pair of bars 12. The slots 20 may extend for most of the length of the screen cylinder 10 between the two annular end flanges.

By having slots 20 extending for most of the length of the screen cylinder 10, the screen cylinder 10 can generally provide increased open area through which acceptable pulp or other solid suspensions can flow. The screen cylinder 10 is depicted in FIGS. 1 and 2 as an outward flow screen cylinder 10 in which the acceptable solid suspension generally flows radially outward through the slots 20. However, the features of the present disclosure may also be used with an inward flow screen cylinder or any other type of pulp screen device utilizing a plurality of profiled bars. Also, so that the features can been shown clearly, the drawings shown are not to scale and the size of a slot 20 is exaggerated to appear larger than a drawing in proper scale.

Referring to FIG. 3, a cross-sectional view of an embodiment of the profiled bars 12 mounted on a support ring 14 of a screen cylinder is depicted. Each of the bars 12 may have an attachment end 30 coupled to the support rings 14. Each of the bars 12 may have an inflow surface 32 facing away from the at least one support ring 14. The inflow surfaces 32 of the plurality of bars 12 form the slotted cylindrical wall 16 (FIG. 2) of the screen cylinder 10. Still referring to FIG. 3, each of the bars 12 may have a first side surface 33 extending from the ridge 39 and inflow surface 32 to the attachment end 30 of the profiled bar 12, which is opposite the inflow surface 32. Each of the profiled bars 12 may have a second side surface 35 on an opposite side from the first side surface 33 and extending from the inflow surface 32 to the attachment end 30 of the profiled bar 12. The first side surface 33 includes a first slot surface portion 34 therein. And, the second side surface 35 includes a second slot surface portion 36 therein. The first slot surface 34 of one profiled bar 12 and the second slot surface 36 of another adjacent profiled bar 12 define one of the slots 20 of the screen cylinder 10. When two profiled bars 12 are adjacent, the first slot surface 34 of the first profiled bar and the second slot surface 36 of the second profiled bar facing the first bar define the slot width, namely, the closest distance between the first and the second profiled bars.

Referring to FIGS. 3 and 4, the first slot surface 34 may have a flat contour, and the second slot surface 36 may also have a flat contour. The first side surface 33 meets the inflow surface 32 at an upper ridge 39 that protrudes radially inward and towards an adjacent bar located counter-clockwise (or to the right as shown in FIGS. 3 and 4) therefrom. The upper ridge 39 is in the form of a corner or curve between the first side surface 33 and the inflow surface 32. Downstream from first slot surface 34, the bar first side surface 33 has a slight contour variation between the upper ridge 39 and the attachment end 30. However, in other embodiments no contour variation or a different contour variation may exist. The second slot surface 36 may meet the inflow surface 32 of the profiled bar 12 at a radially lower ridge or transition area 38 that connects to the inflow surface 32. The transition area is normally in the form of a corner or curve between the inflow surface 32 and second slot surface 36 of the second side surface 35. The upper ridge 39 is located at a radial distance more upstream, e.g., for an outflow cylinder as shown in FIG. 1-4 at a radial distance less than a radial distance of the transition area 38, and the upper ridge 39 extends at a circumferential location near, at or past a location where a transition area 38 of an adjacent bar meets a second slot surface 36 and/or second side surface 35 of the adjacent bar. Downstream of the transition area 38 and second slot surface 36 of the profiled bar 12, the second side surface 35 of the bar connects to the attachment end 30 of the bar. As previously discussed, the flow of the solid suspension through the slot 20 is generally from the inflow surface 32 of the profiled bars 12 towards the attachments ends 30.

For a screen cylinder 10 for screening paper pulp, the slot 20 may have a slot width that is anywhere between 0.08 to 0.50 mm. However, for applications in other industries, the spacing between profiled bars 12 and slot widths may be larger or smaller depending on the specific industry application. The slot width of the slot 20 should be consistent along the longitudinal length of the profiled bars 12.

A wear resistant coating 50 is located on the inflow surface 32 of the bars 12. The wear resistant 50 coating may be applied to the entire length of each of the bars 12 and screen cylinder 10. In other embodiments, the coating may be applied to sections of the bars. Details of the wear resistant coating and the application thereof to the bar will be described in more detail herein.

Each of the profiled bars 12 may be formed from a base metal 46 (FIG. 4) upon which the wear resistant coating is applied. The base metal 46 may be a rigid metal having strength sufficient to withstand the pressure pulses from the rotor without deforming or breaking. In some embodiments, the base metal 46 may be stainless steel, such as 304L stainless steel or 316L stainless steel. The base metal 46 without the wear resistant coating 50 may have a hardness value less than the hardness value of the wear resistant coating 50. For example, the base metal 46 may have a hardness of less than 500HV0.05.

Referring to FIG. 4, the wear resistant coating 50 is coated onto the base metal 46 of the profiled bar 12 on the inflow surface. The axially-extending wedgewire bars have a profile shape and inflow surface shape optimized to apply a spray-on wear resistant coating on their inflow surface using a high-velocity thermal spray technique such as HVOF. The wear resistant coating 50 is sprayed on the inflow surface 32 of the profiled bars. The inflow surface 32 of the bars in the screen cylinder may experience the greatest wear from flow of the solid suspension. It is preferred that the wear resistant coating 50 does not extend past a plane 200 extending coplanar from the first slot surface 34 at a location defining the narrowest dimension of a slot between the first slot surface of a first bar and the second slot surface of an adjacent bar which faces the first slot surface of the first bar. The wear resistant coating 50 preferably does not extend past the ridge 39. The features and techniques disclosed herein facilitate minimizing overspray and minimizing the coating material extending past the plane 200 and ridge 39 or into the slot 20.

Referring to FIG. 5, a cross-sectional view of uncoated bars in the screen cylinder 10 is shown, formed of the base material 46. The shape of the bars is optimized to receive a spray-on wear resistant coating while minimizing the coating being applied on the surface defining the slot on the first slot surface 34 proximate the ridge 39. For example, the base material forming the inflow-facing surface of the axially-extending bars includes a transition area 38 proximate the second slot surface 36. The transition area 38 connects the second slot surface 36 to the inflow facing surface 32. A first area 132 of the inflow facing surface is proximate the transition area 38. The first area 132 extends towards the ridge 39 and has a concave surface area. A second area 134 of the inflow facing surface is adjacent the first area and includes a convex surface area.

The first area 132 increases in slope in the circumferential direction. The second area 134 of the inflow-facing surface adjacent the first area forming the convex surface area decreases in slope. The slope of each area is measured at a point on a plane tangential to the inflow surface area from the support ring. The first area and second area each preferably do not exhibit a negative slope. A portion of the first area proximate the transition area may form a generally flat surface. A portion of the second area proximate the ridge may also form a relatively flat area. The area between the first area proximate the transition area and the second area proximate the ridge may also form a relatively flat surface, but this area is inclined. Accordingly, the first area and second area form a relatively flat area therebetween on the inflow facing surface of relatively constant slope. The profile of the inflow surface may resemble a smooth continuous wave shape, or a shape approximating a wave shape but having some flat areas. Thus, the concave and/or convex areas on the inflow surface of the bars, may include and/or be formed of flat areas.

For example, in some aspects, the first area proximate the transition area may form a generally flat surface. This generally flat area proximate the transition area may be less than about 50 percent of the maximum width of the bar, and preferably less than about 20 percent of the maximum width of the bar. Also, this flat surface may face normal to the radius of the screen cylinder. The second area proximate the ridge may also form a generally flat area. This generally flat area proximate the ridge may be less than about 50 percent of the maximum width of the bar, and preferably less than about 20 percent of the maximum width of the bar. Also, this flat surface may face normal to the radius of the screen cylinder. The area between the first area proximate the transition area and the second area proximate the ridge may also be a flat surface, but inclined. For example, the first area and second area may form a relatively flat area on the inflow-facing surface of relatively constant slope.

The orientation and the shape of the bars are optimized to allow for the spray-on wear resistant coating. For instance, the angles formed by the bars and their surfaces, coupled with the angle used to spray the wear resistant coating, including varying the angles, helps minimize the unwanted deposit of the wear resistant coating on the slot surfaces 34, 36 and side surfaces 33, 35 of the bars. This unwanted deposit may occur by the spray-on coating deflecting off the surface of the bars when applied. To minimize this effect, the ridge of each bar extends circumferentially near, at or past the first slot surface of the same bar. Also, the first area 132 and second area are formed of concave and convex surfaces, respectively. The shape of these surfaces and the spray angle used to apply the wear resistant coating help minimize and/or prevent the coating from deflecting onto the adjacent bar and particularly the first side surface 33 and first slot surface of such adjacent bar. Also, such shape, together with other features and techniques disclosed herein, facilitates maximizing overall deposition efficiency of the coating, maximizes the coating thickness on the inflow surface near the ridge 39, and minimizes the area on the inflow surface near the transition area which may not receive the coating.

For example, by using the wire configuration and shape disclosed herein together with varying the spray angle of the wear resistant coating applied to the bars, the coating thickness on the inflow surface near the ridge 39 (where excessive wear may occur) can be maximized, and the area on the inflow surface near the transition area which may otherwise not receive adequate coating (because it is effectively blocked by the ridge of adjacent bar) is minimized.

Referring still to FIG. 5, a preferred configuration of the bars prior to applying a wear resistant coating is shown. For example, a line from a first plane 136 is shown. The first plane 136 extends axially and radially from the center of the cylindrical screening medium to a circumferential location 142 on the bar where the upper ridge 39 of the bar is closest to an adjacent facing bar. For example, the circumferentially outermost location of the upper ridge 39 in the clockwise direction in FIG. 5. In addition, a line from a second plane 144 is shown. The second plane 144 extends coplanar from the inflow facing surface 32 at a location 146 where this surface meets the transition area 38. The angle $\Theta$ between the first plane 136 and the second plane 144 should be greater than or equal to 80 degrees and preferably be between 80 and 90 degrees. Also, the slope of the inflow surface, viewed from a cross section as shown for example in FIG. 5, should be less than 30 degrees at any location thereon. In other words, the slope of the inflow surface 32 should always be less than 30 degrees. Also, the slope of the inflow surface 32 from a point proximate the transition area 38 should preferably be between zero and ten degrees. And, the slope of the inflow surface 32 proximate the upper ridge 39 should be preferably between zero and ten degrees. The slope of the inflow surface 32 between the area proximate the transition area 38 and the upper ridge 39 should increase from zero to ten degrees up to twenty nine degrees. The slope of the inflow surface 32 is measured as the angle $\alpha$ between i) a line normal to a plane extending axially and radially from the center of the cylindrical screening medium and ii) a line tangential to a location or point on the inflow surface 32 where the slope is determined. The first ten to fifteen percent of the inflow surface 32 from the transition area preferably has a slope of between zero and ten degrees, and the latter twenty to twenty-three percent of the inflow surface 32 proximate the upper ridge 39 preferably also has a slope of between zero and ten degrees. And, the area between the first ten to fifteen percent of the inflow surface 32 and latter twenty to twenty-three percent of the inflow surface 32 preferably has a slope of between zero to ten degrees and twenty nine degrees.

Preferably, the wear resistant coating 50 is sprayed only on the inflow surface 32 of the profiled bars 12. Applying the wear resistant coating 50 may include any of the coating processes discussed herein, and the wear resistant coating 50 may be any of the materials discussed herein. Preferably, applying the wear resistant a coating to at least the inflow surface 32 may include a thermal spraying process. In some embodiments, the thermal spraying process may include a high velocity oxygen-fuel (HVOF) process.

The bars 12 forming the screening medium are coated on all or almost all of the inflow faces or surfaces 32 preferably using a high-speed flame spraying under combustion of a liquid or gaseous fuel. A high-velocity flame nozzle such as a high-velocity oxygen flame (HVOF) is used to apply the wear resistant coating to the inflow side faces of the bars. This technique leads to an integral bonding of the coating with the bar surface. The coating highly adheres to the bar surface and results in a dense grain structure thereon.

The wear resistant coating is applied to inflow surfaces to form a final coating which is preferably between 75-300 microns in nominal thickness, and more preferably between 75-150 microns, and even more preferably about 120-150 microns. The thickness of the wear resistant coating preferably varies by less than twenty percent and ideally less than ten percent. In some embodiments, the wear resistant coating 50 may have a thickness of anywhere between 50 and 300 microns without departing from the scope of the present disclosure. The nominal thickness of the final coating may thus be anywhere between 5 and 300 microns, inclusive of any and all thicknesses therebetween.

The wear resistant coating 50 should have a hardness sufficient to reduce wear of the wedgewire bars during operation of the screen cylinder 10. The wear resistant coating 50 should have a hardness greater than the hardness of the base metal 46 of the bars 12. For example, the wear resistant coating 50 may have a hardness value greater than the hardness value of cold-rolled stainless steel, which is about 400HV0.05. The wear resistant coating 50 may have a hardness value between 500HV0.05 to 1200HV0.05. The hardness values may be determined through measurements performed in accordance with standard Vickers hardness test methods. The wear resistant coating 50 should have a wear resistant coating on the inflow surface that is relatively smooth to reduce the resistance to flow of the solid suspension through the screen cylinder 10.

Referring to FIGS. 6a and 6b, the variability of a spray nozzle 54 which is capable of rotating in the circumferential direction and relative to the inflow surface 32 of the axially extending bars 12, is shown. Spray nozzle 54 sprays a plume of wear resistant coating through its opening or orifice at a high velocity, using well-known high velocity thermal spray techniques. The spray leaves the nozzle 54 in the form of a thin cylindrical plume, typically about 7 mm in diameter with a higher concentration of the coating within the center of the plume which is about 3 mm in diameter. The nozzle 54 thus forms a spray angle representing the difference from the direction of the spray exiting the nozzle compared to the direction of spray when the nozzle is co-linear with a line from the center of the cylinder. For example, the spray angle may be defined by the angle between: 1) the line 207 at the center of the spray plume exiting the nozzle and 2) a radial line 206 from the center axis of the cylinder. Thus, if the nozzle is pointed in the same direction co-linear with a radial line 206, then the spray angle is generally referred to as zero degrees. FIG. 6a shows such a zero-degree spray angle. However, the spray nozzle may rotate clockwise/counter-clockwise to vary the spray angle. For example, as shown in FIG. 6b, a spray angle of about 14 degrees is shown.

Referring to FIGS. 6a, 6b, 7, 8 and 9, a system for applying the wear resistant coating to the screen cylinder 10 is shown. In this system, a robotic arm 52 includes a spray nozzle 54 at its end. The spray nozzle 54 is adapted to spray coating materials to create the wear resistant coating 50 on the inflow side of the screen cylinder onto the inflow surfaces 32 of the bars. The robotic arm 52 is oriented to allow the spray nozzle 54 to travel axially inside the screen cylinder 10. The robotic arm 52 may travel the entire length of the cylinder if possible. Or, the robotic arm may travel a portion of the length of the cylinder to coat only part of the cylinder and the cylinder flipped to allow the robotic arm to travel the remaining length of the cylinder and coat any remaining desired portions of the bars. The spray nozzle 54 is rotatable in the circumferential direction and also moves at least in the axial direction, and optionally in an axial plane relative to the radial direction of the screen cylinder 10. The spray nozzle sprays the wear resistant coating, for example, in a path about 3 to 7 millimeters wide. Each pass deposits, for example, a layer of coating about 10 microns thick. By varying the angle of the spray nozzle in an axial plane for different spray passes along the axial length of the cylinder, the wear resistant coating 50 can be deposited on desirable locations of bars and specifically the inflow surfaces thereof. And, overspray of the wear resistant coating onto undesirable areas such as the first side surface and first slot surface can be minimized and thus a resultant layer of coating on such areas can be minimized. In one embodiment, the screen cylinder 10 can be rotated using a rotating platform 56 while the spray nozzle 54 applies the coating to create the coated surface 50.

Figure 8:
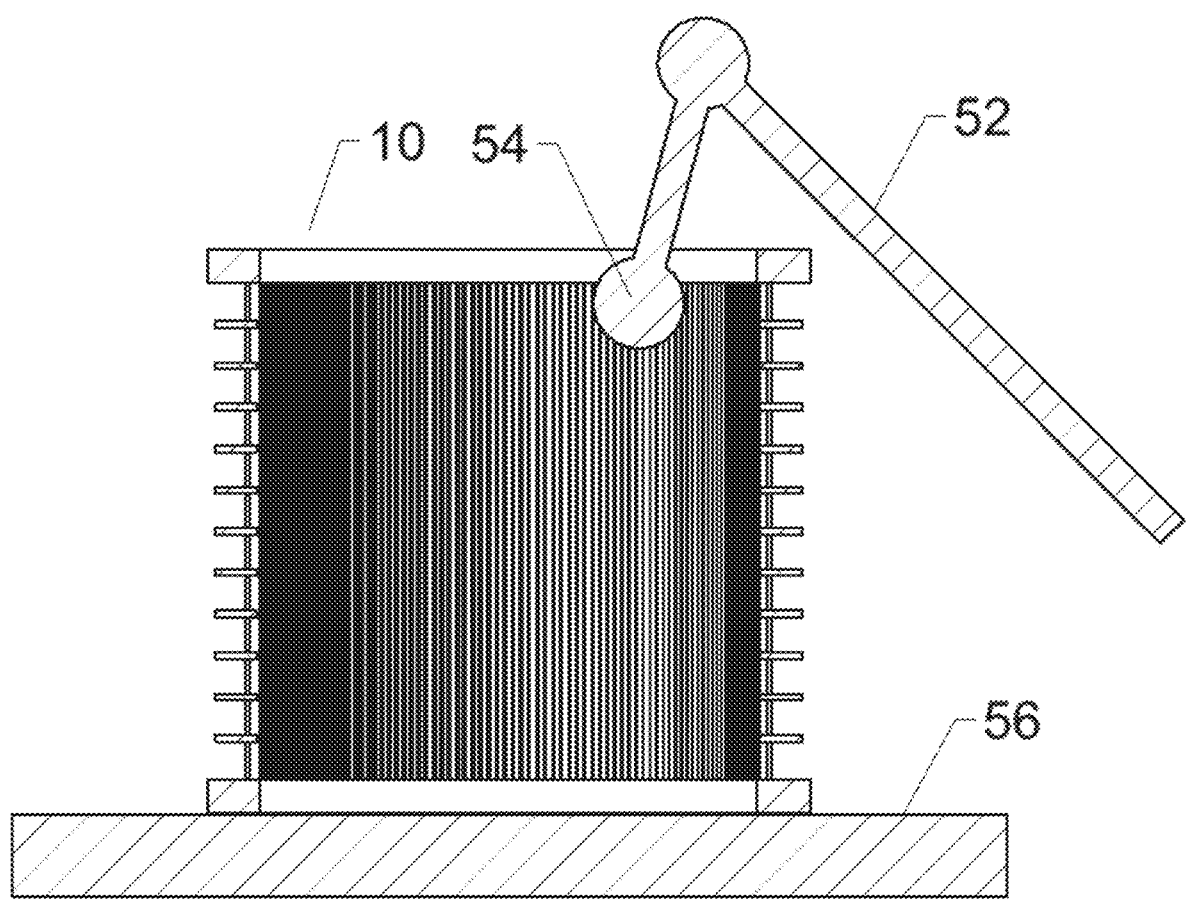
FIG. 8 depicts a cut-away section of a screen cylinder on a rotatable platform along with a robotic arm having a spray nozzle used to apply the wear resistant coating.

Referring to FIG. 8, a technique for applying the wear resistant coating 50 will now be described. Using this technique, the spray nozzle 54 applies a 10 micron thick coating in each axial pass. The screen cylinder 10 may be rotated during each axial pass. However, it may not be necessary to rotate the screen cylinder during axial passes of the spray nozzle. Also, the screen cylinder may be rotated between, but not during, one or more axial passes or series of axial passes of the spray nozzle.

Referring back to FIG. 7, the cylinder 10 may be rotated on the platform 56 while the coating is applied. While the cylinder rotates, a first series of axial passes occurs where the spray nozzle 54 travels the entire axial length of the screen cylinder 10 from first end to second end and then from second end to first end. The wear resistant coating is continuously sprayed onto the bars during the axial passes of the spray nozzle 54. For simplicity a series of cycles of axial passes will be described herein as a first pass from a first end to the second end and then a second pass in reverse from the second end to the first end. However, a series of cycles of axial passes may include more than two passes, if desired.

Figure 9:
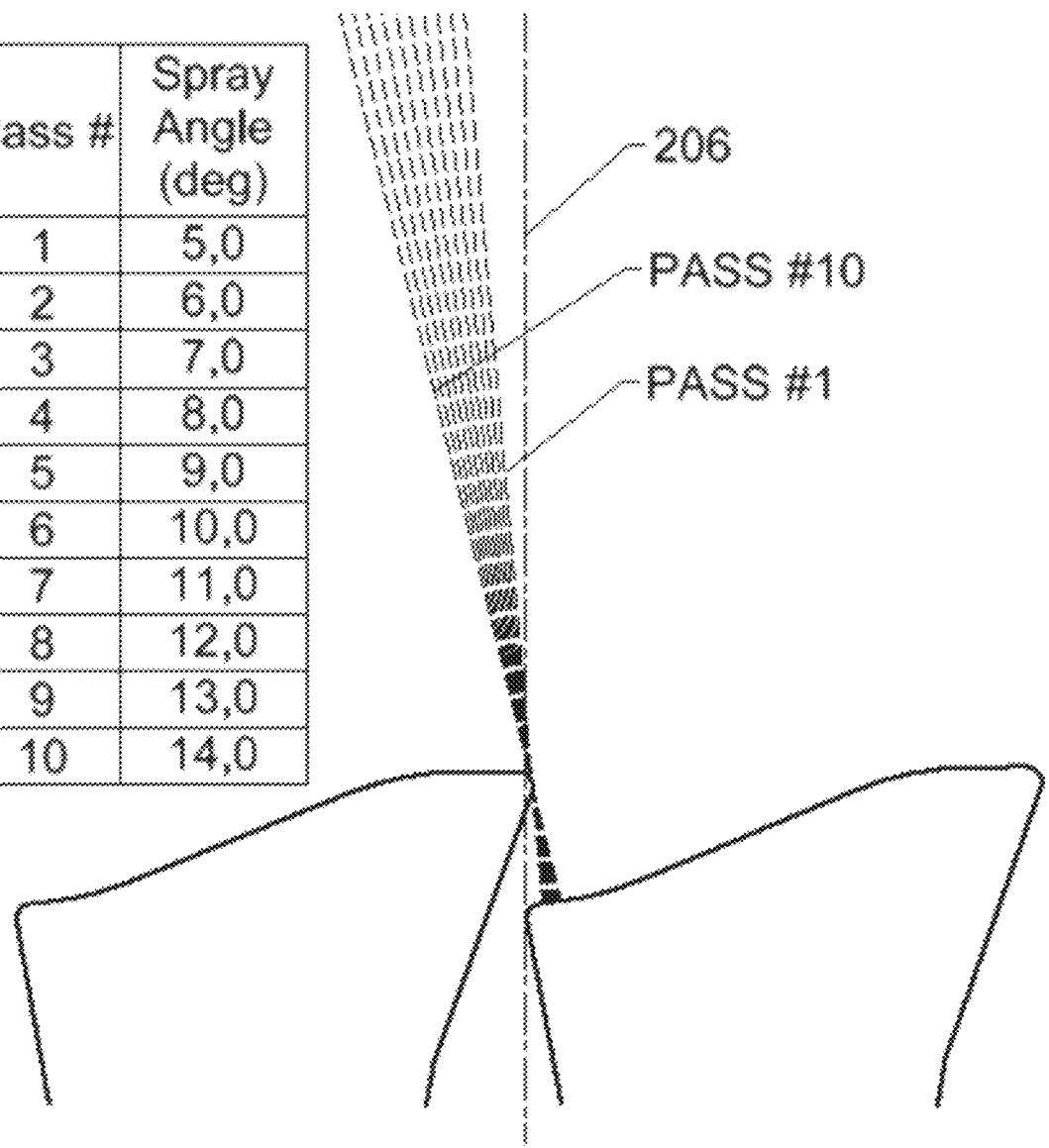
FIG. 9 depicts a schematic representation of the variation in circumferential spray angles to apply the wear resistant coating on the bars of the screen cylinder of FIG. 1.

Referring now to FIG. 9, a schematic representation of one example of preferred variations of the spray angle of the nozzle 54 in the circumferential direction, as described previously with reference to FIGS. 6a and 6b, is shown. In this example, there are 10 spray passes, which occur while the cylinder is rotating at a rate where the bars 12 move at a particular inflow surface speed. In addition, the nozzle moves axially at a particular rate per rotation of the screen cylinder. This results in an application pattern of the wear resistant coating forming a relatively tight spiral along the inflow surface of the screen cylinder. The first axial spray pass of the nozzle occurs at a spray angle of 5 degrees. After each spray pass the angle of the spray nozzle is rotated one degree in the circumferential direction from a bar's transition area 38 to its ridge 39, which corresponds to counter-clockwise in FIG. 9. Thus, the 10th pass will occur at a spray angle (as defined above) of 14 degrees. This results in 10 spray passes with each spray pass being at a one-degree larger spray angle for all such angles between 5 and 14 degrees. The resultant wear resistant coating will be about 100 microns in this example as each spray pass deposits a layer of coating about 10 microns thick. However, by increasing or decreasing the number of passes, a final wear resistant coating of different thickness may be achieved. In addition, by varying the speed of rotation of the screen cylinder and/or the axial speed of the spray nozzle, the thickness of each layer of coating deposited per pass can be varied.

Referring now to FIG. 10, the first three layers of wear resistant coating 340, 440 and 540 are shown applied on the inflow surface of an axially-extending bar. Because each layer is applied at a different spray angle, the layers are not identical or uniform in shape. Similarly, while the coating is, in general, relatively uniform in thickness, the ends of the resulting coating 50 at or near the transition area and ridge may be sloped. The first layer of coating 340 was sprayed onto the inflow surface of the bar at a first spray angle of about 5 degrees, the second layer at 6 degrees and the third layer at 7 degrees. These spray angles, together with the shape of the inflow surface 32, particularly the transition area 38, first area 132, second area 134 and ridge 39 (as shown in FIG. 5), as well as the orientation of bars including the resulting slot width, results in a configuration where the unwanted overspray of the wear resistant coating onto the slot surfaces of the bar and side surfaces of the bar are minimized. For example, little or no wear resistant coating will deflect from the inflow surface 32 of a bar onto the first side surface 33 or slot surface of an adjacent bar. In addition, the ridge 39 of each bar effectively acts as a mask where the spray of the wear resistant coating near the ridge area of a bar will be blocked by the ridge 39 from entering into the slot area, transition area and second slot surface of an adjacent bar. For example, the ridge 39 of the first bar in FIG. 10, will block the spray exiting the nozzle from being deposited on the transition area 38 of the second bar, so that the first layer of coating 340 will be away from the slot surfaces. In addition, by changing the spray angle for the second 440 and third layer 540 of coating one degree each as described above, each layer is deposited on the inflow surface starting at a location further away from the transition area. Furthermore, this results in a smooth edge of the final wear resistant coating. And, the spray angles changing from 5 to 14 degrees between each spray pass coupled with the shape of the inflow surface and edges of the bar will result in less deflection of spray from the inflow surface onto unwanted areas.

The wear resistant coating 50 can, for example, be a tungsten carbide or chromium carbide-containing hard metal coating. Basic elements, such as, for example, Ti, V, Nb, Mo, Ta and Hf, can also occur as carbides and can be used in carbide-containing wear resistant coatings. Cobalt, chromium and nickel carbides can be used the wear resistant coatings as well. The screen cylinder bars can be coated with the wear resistant coating by thermal spraying. Any material which has a stable melt state, for example metal, ceramic or alloys thereof, can be used as the coating material. Various thermal spraying methods for the wear resistant coating material include flame spraying, arc spraying, plasma spraying, vacuum plasma spraying, high-speed flame spraying and detonation spraying explosion spraying. For example, high-speed flame spraying (HVOF, HVAF) can be used for the formation of hard metal coatings, for example WC—Co (Cr) and $Cr_3C_2$-NiCr.

Using such techniques, a coating 50 with optimum hardness, wear resistance and fracture toughness can be achieved. Wear resistant thermally-sprayable hard metal coatings may contain, in addition to carbide, other hard particles such as nitrides, oxides or borides.

The base material of the bars 12 is typically stainless steel, but may be comprised of other metals and alloys. Preferably, the wear resistant coating 50 is applied to the inflow-side surface 32 or face of the bars at one or more predefined angles relative to the inflow side surface 32 or face of the bars, to ensure the desired coating profile. The wear resistant coating may be applied by one or a plurality of spray nozzles or a nozzle with multiple spray heads 54. The angle of the spray nozzles or head(s) may be adjustable and may vary depending upon the situation. For example, the angle of the spray nozzle 54 may vary during subsequent spray passes thereof.

As previously discussed herein, the screen cylinders 10 that include the profiled bars 12 having wear resistant coatings 50 may be used to process solid-in-liquid suspensions of cellulose or other fibers in the pulp in paper industry, as described herein. However, the screen cylinders 10 may not be limited to use in the pulp and paper industry. For example, screen cylinders 10 of the present disclosure having the coated profiled bars 12 may be used to screen solid suspensions and/or slurries to remove oversized solid contaminants in mining and drilling applications, food preparation and processing operations, water treatment processes, coating operations, and other industries.

While various embodiments of the profiled bars 12 for the screen cylinder 10 and methods for making and using the profiled bars 12 have been described herein, it should be understood that it is contemplated that each of these embodiments and techniques may be used separately or in conjunction with one or more embodiments and techniques. It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modifications and variations come within the scope of the appended claims and their equivalents.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect.

What is claimed is:

1. A screen cylinder comprising:
 a cylindrical screening media having a plurality of circumferentially-spaced axially extending slots formed between axially-extending bars, the screening media having an inflow side and an opposite outflow side;
 the bars each being formed of a base material comprising:
  an inflow facing surface,
  a first side surface having a first slot surface defining a slot,
  a second side surface having a second slot surface opposite the first side surface defining an adjacent slot, wherein a slot width is defined as the closest distance between the first side surface of a bar and the second side surface of an adjacent bar,
  the inflow facing surface being between the first side surface and the second side surface,
  a transition area connecting the second slot surface to the inflow facing surface and
  a ridge between the inflow facing surface and the first side surface; characterized in that
  the ridge i) is located more upstream a direction of flow than the transition area and ii) extends at a circumferential location at or past a location of the first side surface defining the slot width;

wherein an angle formed by: i) a first plane extending axially and radially from the center of the cylindrical screening media to a circumferential location where the ridge of a first bar is closest an adjacent facing bar and ii) a second plane extending coplanar from the inflow facing surface of the adjacent bar at a location where the inflow facing surface of the adjacent bar meets the transition area of the adjacent bar facing the first bar is greater than or equal to 80 degrees;

wherein a slope of the inflow facing surface measured between i) a line normal to a plane extending axially and radially from the center of the cylindrical screening medium and ii) a line tangential to a location on the inflow facing surface, is less than thirty degrees at all locations on the inflow facing surface; and wherein a portion of the axially extending bars comprises a spray-on wear resistant coating over the base material and on the inflow facing surface of the bars.

2. The screen cylinder of claim 1 wherein the wear resistant coating does not form a layer on the bar which extends past the first plane.

3. The screen cylinder of claim 2 wherein the angle formed by the first plane and second plane is between 80 and 90 degrees.

4. The screen cylinder of claim 1 wherein the base material forming the inflow facing surface of the axially extending bars comprises:
a first area of the inflow facing surface proximate the transition area, the first area extending towards the ridge and comprising a concave surface area; and
a second area of the inflow facing surface adjacent the first area comprising a convex surface area.

5. The screen cylinder of claim 4 wherein:
the first area extending towards the ridge forming the concave surface area includes an area which increases in slope in the circumferential direction, wherein each slope of the concave surface area is measured at a point on a plane tangential to the surface area from the support ring, and
the second area of the inflow facing surface adjacent the first area forming the convex surface area includes an area which decreases in slope, wherein each slope of the convex surface area is measured at a point on a plane tangential to the surface area from the support ring, the second area having a surface thereon proximate the ridge which has a slope less than a slope of the second area proximate the first area.

6. The screen cylinder of claim 5 wherein the first area and second area each do not exhibit a negative slope.

7. The screen cylinder of claim 5 wherein the first area and second area form a flat area on the inflow facing surface of constant slope.

8. The screen cylinder of claim 1 wherein the wear resistant coating is between 75-300 microns in thickness.

9. The screen cylinder of claim 1 wherein the thickness of the wear resistant coating varies by less than twenty percent.

10. The screen cylinder of claim 1 wherein the wear resistant coating comprises tungsten carbide, chromium carbide, titanium nitride, chromium nitride, electroless-plated nickel, ceramic coating, alumina, or combinations thereof.

11. The screen cylinder of claim 1 wherein the wear resistant coating comprises a hardness 500HV0.05 or more.

12. The screen cylinder of claim 11 wherein the wear resistant coating comprises a hardness 900HV0.05 or more.

13. The screen cylinder of claim 1, wherein the ridge of the first bar extends at a circumferential location at or past a circumferential location of a transition area of the adjacent bar.

14. A screen cylinder comprising:
a cylindrical screening media having a plurality of circumferentially-spaced axially-extending slots formed between a plurality of axially-extending bars, the screening media having an inflow side and an opposite outflow side;
the bars each having an inflow facing surface, a first side surface having a first slot surface, and a second side surface having a second slot surface opposite the first slot surface, the inflow facing surface being between the first side surface and the second side surface, and a ridge between the inflow facing surface and the first slot surface;
characterized in that the inflow facing surface of the axially extending bars comprises:
a transition area proximate the second slot surface, the transition area connecting the second slot surface to the inflow facing surface,
a first area of the inflow facing surface proximate the transition area, the first area extending towards the ridge and comprising a concave surface area, the first area having an area extending towards the ridge of increasing slope, the slope being measured between i) a line normal to a plane extending axially and radially from a center of the cylindrical screening medium and ii) a line tangential to a location or point on the inflow facing surface;
a second area of the inflow facing surface adjacent the first area comprising a convex surface area, the second area having an area extending towards the ridge of decreased slope, the slope measures at a point on a plane tangential to the surface area from the support ring;
wherein the ridge i) is located more upstream a direction of flow than the transition area and ii) extends at a circumferential location at or past a circumferential location where a transition area of an adjacent bar meets a second slot surface of the adjacent bar; and
wherein the slope of the inflow facing surface is less than thirty degrees at all locations on the inflow surface.

15. The screen cylinder of claim 14 wherein a spray-on wear resistant coating is applied to the inflow facing side of the screening medium and the inflow surface of the bars.

16. The screen cylinder of claim 15 wherein the wear resistant coating is between 75-300 microns in thickness.

17. The screen cylinder of claim 16 wherein the first area and second area form a flat area on the inflow facing surface of constant slope.

18. The screen cylinder of claim 17 wherein the wear resistant coating comprises tungsten carbide, chromium carbide, titanium nitride, chromium nitride, electroless-plated nickel, ceramic coating, alumina, or combinations thereof.

19. The screen cylinder of claim 18 wherein the wear resistant coating comprises a hardness 500HV0.05 or more.

20. The screen cylinder of claim 19 wherein the wear resistant coating comprises a hardness 900HV0.05 or more.

21. The screen cylinder of claim 15 wherein the wear resistant coating does not form a layer on the bar which extends circumferentially past the ridge and the transition area of an adjacent bar facing the ridge.

* * * * *